US008799836B1

(12) United States Patent
Bickford et al.

(10) Patent No.: US 8,799,836 B1
(45) Date of Patent: Aug. 5, 2014

(54) YIELD OPTIMIZATION FOR DESIGN LIBRARY ELEMENTS AT LIBRARY ELEMENT LEVEL OR AT PRODUCT LEVEL

(71) Applicant: International Business Machines Corporation, Armonk, NY (US)

(72) Inventors: Jeanne P. S. Bickford, Essex Junction, VT (US); Anand Kumaraswamy, Bangalore (IN); Terry M. Lowe, Apex, NC (US); Mark S. Styduhar, Hinesburg, VT (US); Lijiang L. Wang, South Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/936,811

(22) Filed: Jul. 8, 2013

(51) Int. Cl.
*G06F 17/50* (2006.01)
*G06F 15/04* (2006.01)

(52) U.S. Cl.
USPC .......................................... 716/102; 716/139

(58) Field of Classification Search
USPC ................................................. 716/102, 139
See application file for complete search history.

(56) References Cited

U.S. PATENT DOCUMENTS

| | | | |
|---|---|---|---|
| 6,397,373 B1 | 5/2002 | Tseng et al. | |
| 6,507,930 B1 | 1/2003 | Bass, Jr. et al. | |
| 7,076,749 B2 | 7/2006 | Kemerer et al. | |
| 7,168,061 B2 * | 1/2007 | Roesner et al. | 716/102 |
| 7,302,091 B2 | 11/2007 | Hamaguchi et al. | |
| 7,315,990 B2 | 1/2008 | Archambeault et al. | |
| 7,337,415 B2 | 2/2008 | Bergeron et al. | |
| 7,454,721 B2 | 11/2008 | Hibbeler et al. | |
| 7,721,240 B2 | 5/2010 | Bergeron et al. | |
| 7,725,864 B2 | 5/2010 | Bergeron et al. | |
| 7,818,697 B2 | 10/2010 | Cho | |
| 7,921,390 B2 | 4/2011 | Archambeault et al. | |
| 8,010,916 B2 | 8/2011 | Bickford et al. | |
| 8,015,538 B2 | 9/2011 | Coolbaugh et al. | |
| 8,103,982 B2 | 1/2012 | Scheffer | |
| 8,136,056 B2 | 3/2012 | Scheffer et al. | |
| 2005/0278663 A1 | 12/2005 | Kemerer et al. | |
| 2006/0282813 A1 * | 12/2006 | Jones | 716/18 |
| 2011/0320990 A1 * | 12/2011 | Srinivasan | 716/102 |
| 2014/0033147 A1 * | 1/2014 | Shao et al. | 716/102 |

OTHER PUBLICATIONS

Bickford et al., "Yield Optimization for Third Party Library Elements," 2011, 6 pages, IEEE.

(Continued)

*Primary Examiner* — Suresh Memula
(74) *Attorney, Agent, or Firm* — Richard M. Kotulak; Hoffman Warnick LLC

(57) ABSTRACT

In one embodiment, at least one design library element having a design marker shape is applied to a yield checking tool having library element types, each having a yield checking deck threshold and a marker shape. The design marker shape is compared to each of the marker shapes. A determination is made as to whether the design library element satisfies the yield checking deck threshold associated with the library element type having a matching marker shape. In another embodiment, a product design formed from a design library elements each having a design marker shape is applied to the yield checking tool in a similar manner. In instances where the design library elements do not satisfy the yield checking deck threshold, then the design library element is updated by modifying the design library elements, placement of the design library elements in the product design, and/or wiring connecting the design library elements.

20 Claims, 5 Drawing Sheets

(56) References Cited

OTHER PUBLICATIONS

Graur et al., "Methodology for Balancing Design and Process Tradeoffs for Deep-Subwavelength Technologies," 2011, pp. 1-15, Proceedings of SPIE vol. 7974, 79740C.

Balasinski et al., "From Rule to Model-based Design—A Need for DfP Criteria?," 2007, 8 pages, Proceedings of SPIE, vol. 6730.

Garfield, "An Algorithm for Translating Chemical Names to Molecular Formulas," 1961, pp. 441-513, Institute for Scientific Information.

Maynard et al., "Yield Enhancement Using Recommended Ground Rules," 2004, pp. 98-104, IEEE/Semi Advanced Semiconductor Manufacturing Conference.

* cited by examiner

200

| Library Element Type | YCD Threshold |
|---|---|
| SRAM Type 1 | 0.7 X |
| SRAM Type 2 | 0.8X |
| eDRAM | 0.9 X |
| Digital Logic | 1.0 X |
| Analog | 1.2 X |

FIG. 2

YIELD OPTIMIZATION FOR DESIGN LIBRARY ELEMENTS AT LIBRARY ELEMENT LEVEL OR AT PRODUCT LEVEL

BACKGROUND

This invention relates generally to semiconductor product design, and more particularly, to yield optimization of design library elements at a library element level or at a product level formed from multiple library element types.

Many semiconductor products, particularly application specific integrated circuits (ASICs), are formed by combining pre-designed units (i.e., integrated circuit library elements) that are organized by circuit type (e.g., memories, logic devices, core devices, etc.). Each library element includes a set of integrated circuit devices that are wired together in order to perform a specific function. In addition, each library element must comply with semiconductor technology layout requirements such as line width, line-to-line space, overlap, etc., so that the sensitivity of the library element to various manufacturing processes can be accounted for when the library element is used in an integrated circuit product and manufacturing processes that fabricate the product. These semiconductor technology layout requirements can generally be classified as required rules and preferred rules. Required rules specify the requirements that must be complied with to satisfy design specifications for release of a product containing such a design, while preferred rules specify rules that if complied with will lead to a better yield of the product. The preferred rules for these library elements will vary when used to form a memory, a logic device, or some other complex device.

Typically, a yield checking tool is used in the design process of a semiconductor product to determine if the design satisfies the required level of compliance to preferred rules. The preferred rules are generally specified in terms of a threshold value and incorporated in a set of rules called a yield checking deck. For example, if a required rule states that an analog component used in a design must meet a threshold of at least 80%, then this value would be the threshold value that needs to be satisfied. In this manner, if a library element selected for the design has a 75% threshold, then the yield checking tool would note that this library element does not satisfy the required rule, leading the designer to find another element for the design. Currently available yield checking tools typically assign one threshold to one library element. These yield checking tools do not take into account that each library element can have different types of implementations of the logic embodied by the element. For example, the different types of library elements for a library element type can vary by area and speed. Because these yield checking tools typically assign one threshold to one library element, these tools cannot apply multiple thresholds to a library element with multiple thresholds. Typically, in these instances, a semiconductor designer will have to manually work their way through the design, checking library elements having multiple thresholds to ascertain whether required design rules have been met.

SUMMARY

In one embodiment, there is a method disclosed. In this embodiment, the method comprises: receiving at least one design library element having a design marker shape associated therewith; applying a yield checking tool having a plurality of library element types each having a yield checking deck threshold and a marker shape to the at least one design library element; comparing the design marker shape of the at least one design library element to each of the marker shapes associated with the plurality of library element types; ascertaining which of the marker shapes associated with the plurality of library element types matches with the design marker shape associated with the at least one design library element; and determining whether the at least one design library element satisfies the yield checking deck threshold associated with the library element type having a marker shape that matches with the design marker shape of the at least one design library element.

In a second embodiment, there is a method, implemented on a computer system, for optimizing yield of a product design. In this embodiment, the method comprises: obtaining a product design formed from a plurality of design library elements each having a design marker shape associated therewith, the product design further including design library element to design library element placement for the design library elements and product level wiring for the design library elements, the design library element to design library element placement and product level wiring each having a design marker shape associated therewith; applying a yield checking tool having a plurality of library element types, library element to library element placement of the library elements, and product level wiring information of the library elements, the plurality of library element types, library element to library element placement, and product level wiring each having a yield checking deck threshold and a marker shape; comparing each of the design marker shapes of the product design including the design marker shapes associated with the plurality of design library elements, design library element to design library element placement and product level wiring to each of the marker shapes associated with the plurality of library element types, library element to library element placement and product level wiring information in the yield checking tool; for each design marker shape associated with the plurality of design library elements in the product design, design library element to design library element placement and product level wiring, ascertaining a marker shape from the yield checking tool that is a match; and determining whether each of the plurality of design library elements design library element to design library element placement and product level wiring satisfy the yield checking deck thresholds associated with marker shapes in the yield checking tool that are identified as a match.

In a third embodiment, there is a non-transitory computer-readable medium storing computer instructions, which when executed by a computer system, enables the computer system to optimize yield. In this embodiment, the computer instructions comprise: receiving at least one design library element having a design marker shape associated therewith; applying a yield checking tool having a plurality of library element types each having a yield checking deck threshold that is specified to optimize yield and a marker shape to the at least one design library element; comparing the design marker shape of the at least one design library element to each of the marker shapes associated with the plurality of library element types; ascertaining which of the marker shapes associated with the plurality of library element types matches with the design marker shape associated with the at least one design library element; and determining whether the at least one design library element satisfies the yield checking deck threshold associated with the library element type having a marker shape that matches with the design marker shape of the at least one design library element.

BRIEF DESCRIPTION OF THE DRAWINGS

FIG. 2 illustrates an example of yield checking deck thresholds that can be assigned to different types of library elements according to one embodiment of the invention;

DETAILED DESCRIPTION

Figure 1:
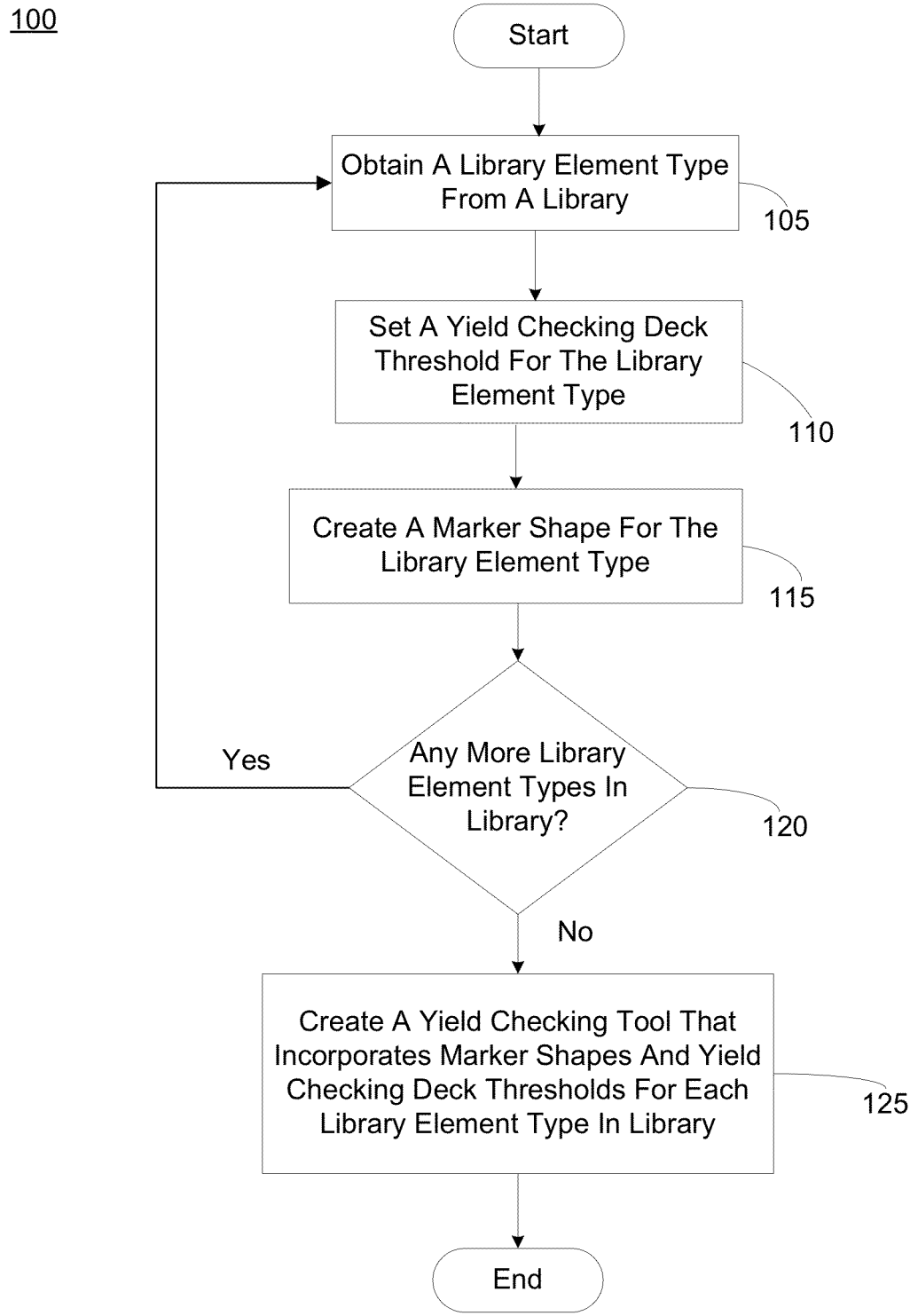
FIG. 1 shows a flow diagram describing an approach for developing a yield checking tool that can apply a yield checking deck threshold to each of the different types of implementations associated with a library element according to one embodiment of the invention.

Referring to the figures, FIG. 1 shows a flow diagram 100 describing an approach for developing a yield checking tool that can apply a yield checking deck threshold to each of the different types of implementations associated with a library element according to one embodiment of the invention. Developing the yield checking tool begins by obtaining a library element type from a library at 105. The library contains library elements and predesigned combinations of library elements called cores. The library elements can include low-level electronic functions such as AND, OR, INVERT, flip-flops, latches, and buffers, etc., while cores can include memories, logic functions, combinatorial logic functions, high-level functions, prior functions, etc. For each library element, the library can have all of the different types of implementations of the logic embodied by the element. Each of the different types of implementations for a library element is referred to as a library element type. Those skilled in the art will appreciate that a library can include other information such as, for example, layouts, schematics, models, timing information, power information, noise information, etc.

Continuing with the description of flow diagram 100 in FIG. 1, a yield checking deck threshold is set for the obtained library element type at 110. As used herein, a yield checking deck threshold is a compliance value associated with the library element type that needs to be satisfied in order to accommodate constraints associated with the required level of compliance to the preferred rules for a design. Required rules generally specify the requirements that must be complied with to satisfy design specifications for release of a product containing such a design, while preferred rules specify rules that if complied with will lead to a better yield of the product.

FIG. 2 illustrates a table 200 containing examples of yield checking deck (YCD) thresholds that can be assigned to different types of library elements in a library according to one embodiment of the invention. Different types of library elements have different design styles, and thus, each type has a different "best practice" associated with implementing the library element in a design. As a result, a different yield checking deck threshold can be assigned to each library element type. For example, analog designs will use larger sized shapes, and therefore, will generally have more space available to meet the required level of compliance to the preferred rules, and therefore, have stricter yield checking deck requirements than a design formed from digital logic.

In FIG. 2, table 200 contains examples of different components that are commonly used in the design of a semiconductor product. In particular, the library elements listed in FIG. 2 include two types of SRAMs (i.e., SRAM Type 1 and SRAM Type 2), an eDRAM, Digital Logic and Analog. Those skilled in the art will appreciate that table 200 is only illustrative of some components that can be used in the design of a semiconductor product and are not meant to be limiting. Each of the yield checking deck thresholds for the library element types listed in FIG. 2 are expressed by using a relational "X" term that represents the relationship of one library element type with respect to another. For example, if it was desirable to use an eDRAM feature in a particular design, then design attributes (e.g., line-to-line spacing, size, etc.) associated with such a feature needs to meet the 0.9× yield checking deck threshold. Those skilled in the art will appreciate that the use of a relational yield checking deck threshold as shown in table 200 is only illustrative of one approach to representing a threshold that accommodates the required level of compliance to recommended rules and is not meant to be limiting. For example, in another approach, the yield checking deck thresholds can be represented as an absolute number for individual rules, or as a composite of degree of compliance of individual rules. Furthermore, the yield checking deck thresholds listed in table 200 for each library element are only examples of one possible threshold value that can be used for that particular library element type and are not meant to be limiting.

Referring back to flow diagram 100 of FIG. 1, a marker shape is created for the library element at 115. As used herein, a marker shape is generally an identifier such as a design layer, a library element naming convention, or any other identifier that distinguishes a library element type from other library element implementations. In some instances, some library element types may not have any specific identifiers, and thus will have no designated thresholds. In order to account for these instances, the various embodiments of the present invention can apply a default threshold value to those library element types that do not have any designated thresholds. These default threshold values applied to library element types can be considered analogous to a marker shape as used herein. In other embodiments, the marker shape can contain further identifier information such as a special action required in checking tools when the marker shape is present that can be tagged to the particular library element type.

Next, a determination is made at 120 to determine if there are any more library element types in the library that need a yield checking deck threshold and a marker shape. If there are more library element types in the library, then another library element is retrieved at 105 and set with a yield checking deck threshold at 110 and a marker shape at 115. This iteration continues until all of the library element types in the library have a yield checking deck threshold and a marker shape.

After all of the library element types in the library have been applied with a yield checking deck threshold and a marker shape, then a yield checking tool can be created at 125 that incorporates these designations. As explained below in more detail, the assignment of a yield checking deck threshold and a marker shape to each of the library element types in a library provides a simplified approach to enable the yield checking tool to take into account the different thresholds associated with the multiple implementations for each of the library element types. The use of such a yield checking tool to check a design library element or a product formed from a combination of design library elements can lead to an optimized yield. In addition, this yield checking tool avoids problems with conventional tools that cannot accommodate multiple thresholds for various implementations of a library element. For example, the yield checking tool described herein obviates the need to implement a complicated manual checking and review of a design, or the need to waive certain stringent requirements to have a less stringent one to accommodate the multiple thresholds.

Figure 3:
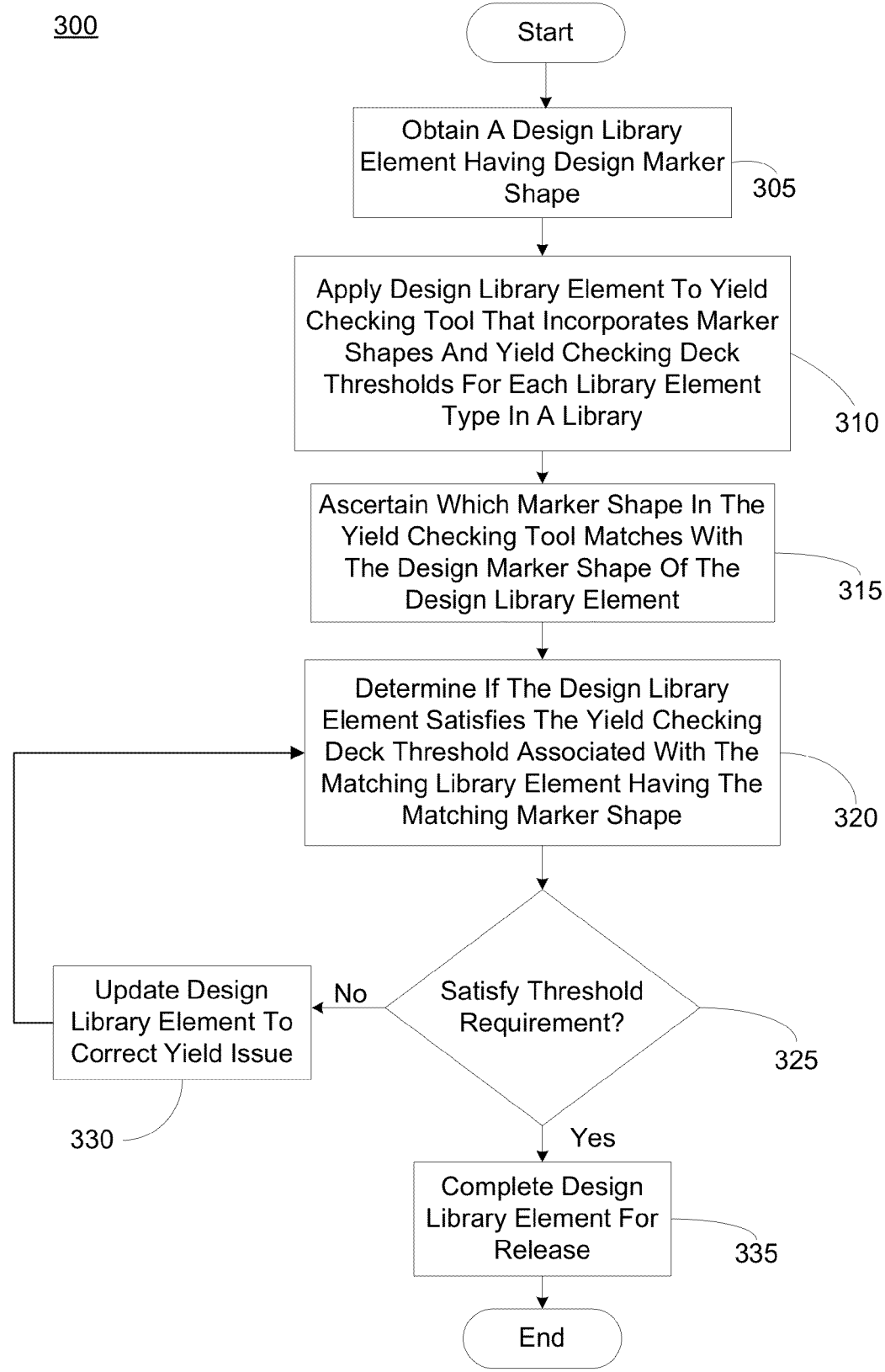
FIG. 3 shows a flow diagram describing an approach of using the yield checking tool developed in FIG. 1 for checking a design library element according to one embodiment of the invention.

FIG. 3 shows a flow diagram 300 describing an approach of using the yield checking tool developed in FIG. 1 for checking a design library element according to one embodiment of the invention. Use of the yield checking tool begins by obtaining a design library element having a design marker shape at 305. The design library element is generally logic, memory, an analog circuit or any combination of logic, memory, or analog circuit that has the potential to be used in the design of a semiconductor product. The design library element can include low-level electronic functions such as AND, OR, INVERT, flip-flops, latches, buffers, memories, PLLs, other analog circuits, etc. The design marker shape is generally an identifier shape that is used to identify the design library element. The design marker shape can include an identifier such as a design layer, a design library element naming convention, or any other identifier that distinguishes a design library element type from other design library element implementations. The design marker shape can also include any applied default threshold values.

A yield checking tool, developed in the manner described in FIG. 1, is applied to the design library element at 310. The yield checking tool has a plurality of library element types stored therein. Each library element type has a yield checking deck threshold and a marker shape associated with it. The yield checking tool ascertains which marker shape in the tool matches the design marker shape of the design library element at 315. In particular, the yield checking tool compares the design marker shape of the design library element to each of the marker shapes associated with the plurality of library element types. The marker shape that matches with the design marker shape is then examined at 320 to determine if the yield checking deck threshold associated with the library element having the matching marker shape is satisfied by the design library element.

If it is determined at 325 that the design library element has not satisfied or fulfilled the yield checking deck threshold, then the design library element is updated at 330 to correct the yield issue that arises by not satisfying the threshold. In this manner, a designer could make modifications to the library element design including, and not limited to, increasing area, improving redundancy, increasing overlap and movement of shapes to improve yield by updating the design library element. After updating the design library element, it is then compared to the yield checking deck threshold at 320 to determine if the threshold requirement has been satisfied at 325. This iteration continues until it is determined at 325 that the threshold requirement has been satisfied. Once it has been determined that the design library element satisfies the yield checking deck threshold, then the element is considered complete and ready for release in a product at 335.

Figure 4:
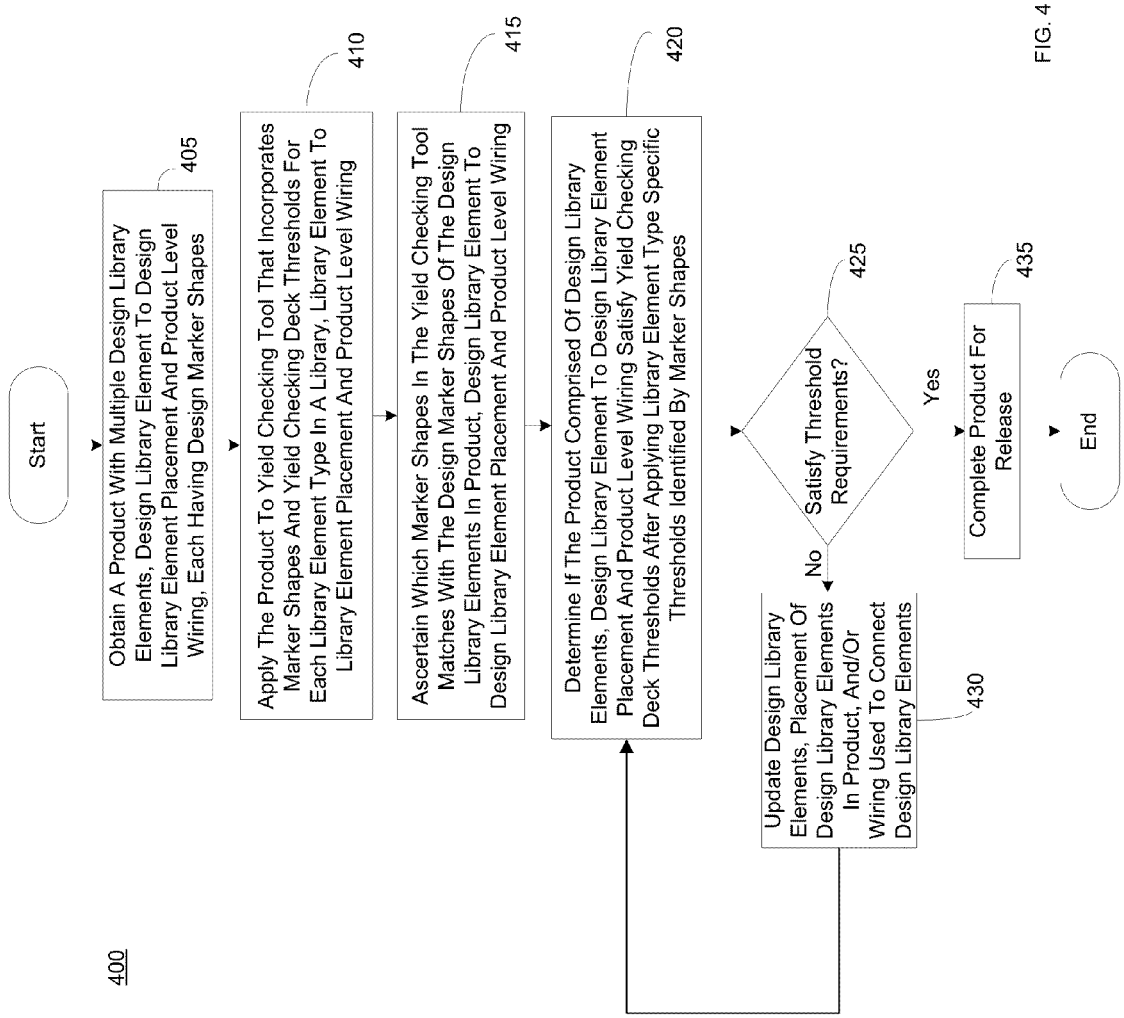
FIG. 4 shows a flow diagram describing an approach of using the yield checking tool developed in FIG. 1 for checking a product formed from a multiple of design library elements according to one embodiment of the invention.

FIG. 4 shows a flow diagram 400 describing an approach of using the yield checking tool developed in FIG. 1 for checking a product formed from a multiple of design library elements according to one embodiment of the invention. Flow diagram 400 of FIG. 4 is similar to flow diagram 300 of FIG. 3, except in this embodiment the yield checking tool formed in the manner described in FIG. 1 is used to check all of the library elements used in a product design that could include mixed design styles. For example, the yield checking tool could be used to check a product made from digital circuit components and analog circuit components. In this manner, the yield checking tool could be used to check each of the design library elements that form the digital circuit components and the analog circuit components by comparing the elements to each of the corresponding yield checking deck thresholds. Design library elements in either the digital circuit components or the analog circuit components that do not satisfy the thresholds can be fixed in order to be made compliant with the required level of compliance to preferred rules. Once all of the design library elements of the digital circuit components or the analog circuit components are compliant, then the semiconductor product can be released. Not only are conventional yield checking tools deficient in handling different implementations of library element types, but these tools are not capable of checking requirements at the product level where the products are designed with different thresholds assigned to library elements.

Referring now to FIG. 4, the use of the yield checking tool to check a semiconductor product begins by obtaining a product formed from multiple design library elements at 405. In this scenario, each of the multiple design library elements can have a design marker shape. The design library elements can include low-level electronic functions such as AND, OR, INVERT, flip-flops, latches, buffers, memories, PLLs, other analog circuits, etc. The design marker shape is generally an identifier shape (e.g., a design layer), a library element naming convention, or other identifier that can be used to uniquely identify a set of design library elements such that a special action can be taken in checking tools when the marker shape is present in the library elements. In addition, the design marker shape can also include any applied default threshold values.

In addition, the product includes information on design library to design library spacing or placement and product level wiring. Design library element to design library element placement information relates to the space between library elements and the orientation of one library element versus another library element, whereas product level wiring information relates to wires and vias used to electrically connect library elements used in a product. The design library element to design library element placement information and the product level wiring information can each have a design marker shape.

A yield checking tool developed in the manner described in FIG. 1 is applied to each design library element of the product at 410. The yield checking tool has a plurality of library element types stored therein. In addition, the yield checking tool includes library element to library element placement information and product level wiring information. Each library element type, library element to library element placement, and product level wiring has a yield checking deck threshold and a marker shape. In places between libraries or product wiring space where no marker shape is present a default threshold can be applied and thus considered analogous to a marker shape. For each design library element in the product, design library element to design library element placement, and product level wiring, the yield checking tool ascertains marker shapes in the tool that match the design marker shape of the design library elements, design library element to design library element placement, and product level wiring in the product at 415. In particular, the yield checking tool compares the design marker shape of each of the design library elements, design library element to design library element placement, and product level wiring to each of the marker shapes associated with the plurality of library element types, library element to library element placement, and product level wiring. The marker shapes that match with the design marker shapes are then examined at 420 to determine if the yield checking deck thresholds associated with the library elements, library element to library element placement, and product level wiring having the matching marker shapes are satisfied by the design library elements.

If it is determined at 425 that any of the design library elements, design library element to design library element placement and product level wiring in the product has not satisfied or fulfilled a corresponding yield checking deck threshold, then the product is updated at 430 to correct the yield issue. Updating the product can include modifying the design library elements, the placement of the design library elements in the product, and/or the wiring used to connect the design library elements that do not satisfy the thresholds. In this manner, a designer could make modifications to the library elements used in a product design, the placement of one library element versus another library element in the product design, or the wiring used in a product design. Modifications to the wiring can include but are not limited to, increasing area, improving redundancy, increasing overlap and movement of shapes to improve yield of the product by updating the design library element, changing the placement of library elements in a product design, and/or changing the wiring used to connect the library elements.

After updating the product, such as by modifying any of the design library elements, the placement of the design library elements in the product design, and/or the wiring used to connect the design library elements, the design library elements are then compared to the corresponding yield checking deck threshold at 420 and evaluated at 425 to determine if the threshold requirements have been satisfied. This update iteration continues until it is determined at 425 that the threshold requirements have been satisfied. Once it has been determined that the design library element, placement of the design library elements in the product design, and wiring used to connect the design library elements in the design satisfy the yield checking deck thresholds, then the product containing the elements are considered complete and ready for release at 435.

The foregoing flow chart of FIGS. 1 and 3-4 show some of the processing functions associated with using a yield checking tool to optimize yield for library elements including their use in products formed from mixed design styles. In this regard, each block in the figures represents a process act associated with performing these functions. It should also be noted that in some alternative implementations, the acts noted in the blocks may occur out of the order noted in the figures or, for example, may in fact be executed substantially concurrently or in the reverse order, depending upon the act involved. Also, one of ordinary skill in the art will recognize that additional blocks that describe the processing functions may be added.

Figure 5:
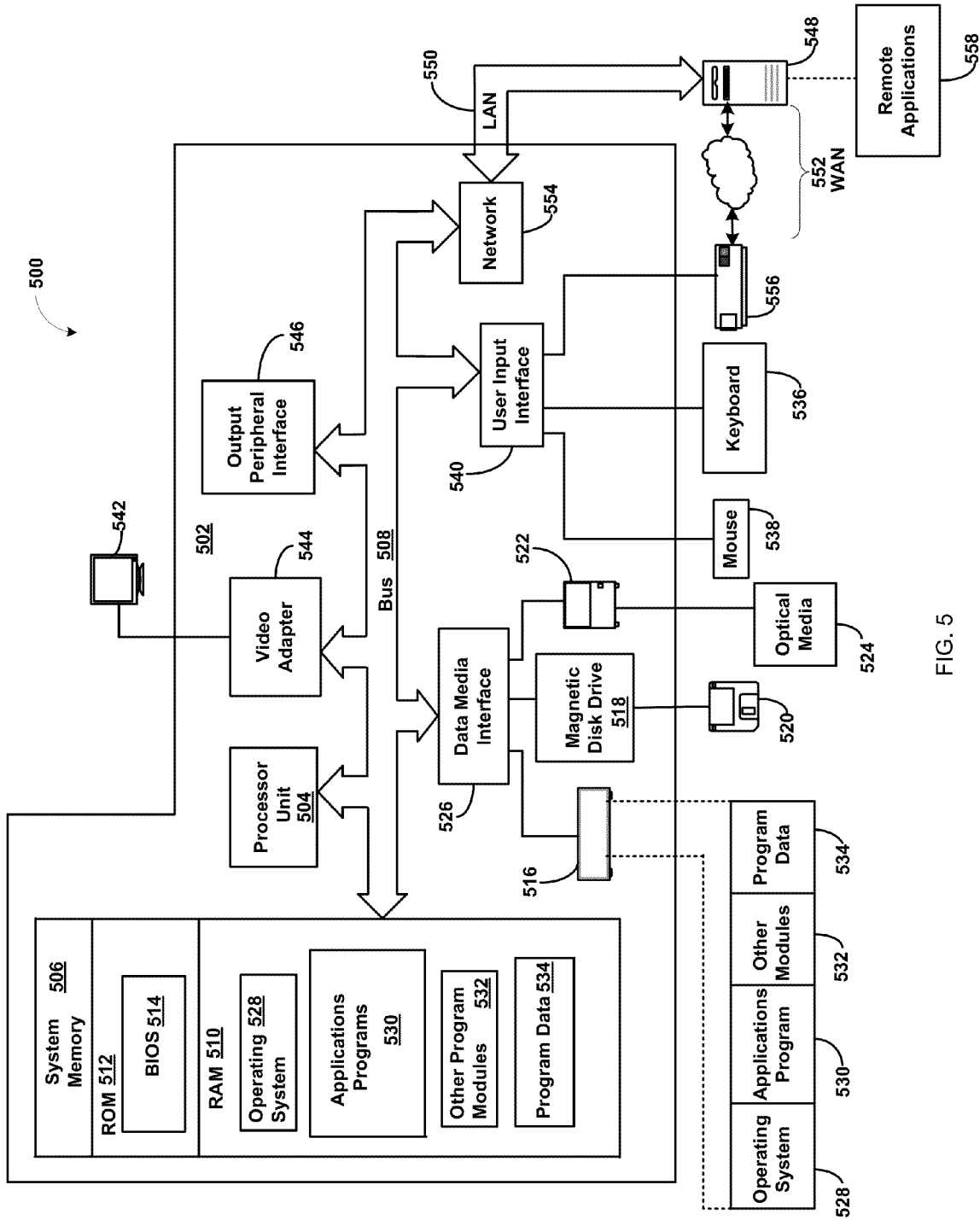
FIG. 5 shows a schematic of an exemplary computing environment in which operations depicted in the flow diagrams of FIGS. 1 and 3-4 may be implemented.

FIG. 5 shows a schematic of an exemplary computing environment 500 in which operations depicted in the flow diagrams depicted in FIGS. 1 and 3-4 may be performed. The exemplary computing environment 500 is only one example of a suitable computing environment and is not intended to suggest any limitation as to the scope of use or functionality of the approach described herein. Neither should the computing environment 500 be interpreted as having any dependency or requirement relating to any one or combination of components illustrated in FIG. 5.

In the computing environment 500 there is a computer 502 which is operational with numerous other general purpose or special purpose computing system environments or configurations. Examples of well-known computing systems, environments, and/or configurations that may be suitable for use with an exemplary computer 502 include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The exemplary computer 502 may be described in the general context of computer-executable instructions, such as program modules, being executed by a computer. Generally, program modules include routines, programs, objects, components, logic, data structures, and so on, that performs particular tasks or implements particular abstract data types. The exemplary computer 502 may be practiced in distributed computing environments where tasks are performed by remote processing devices that are linked through a communications network. In a distributed computing environment, program modules may be located in both local and remote computer storage media including memory storage devices.

As shown in FIG. 5, the computer 502 in the computing environment 500 is shown in the form of a general-purpose computing device. The components of computer 502 may include, but are not limited to, one or more processors or processing units 504, a system memory 506, and a bus 508 that couples various system components including the system memory 506 to the processor 504.

Bus 508 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 502 typically includes a variety of computer readable media. Such media may be any available media that is accessible by computer 502, and it includes both volatile and non-volatile media, removable and non-removable media.

In FIG. 5, the system memory 506 includes computer readable media in the form of volatile memory, such as random access memory (RAM) 510, and/or non-volatile memory, such as ROM 512. A BIOS 514 containing the basic routines that help to transfer information between elements within computer 502, such as during start-up, is stored in ROM 512. RAM 510 typically contains data and/or program modules that are immediately accessible to and/or presently operated on by processor 504.

Computer 502 may further include other removable/non-removable, volatile/non-volatile computer storage media. By way of example only, FIG. 5 illustrates a hard disk drive 516 for reading from and writing to a non-removable, non-volatile magnetic media (not shown and typically called a "hard drive"), a magnetic disk drive 518 for reading from and writing to a removable, non-volatile magnetic disk 520 (e.g., a "floppy disk"), and an optical disk drive 522 for reading from or writing to a removable, non-volatile optical disk 524 such as a CD-ROM, DVD-ROM, CD-RW, DVD-RAM or other optical media. The hard disk drive 516, magnetic disk drive 518, and optical disk drive 522 are each connected to bus 508 by one or more data media interfaces 526.

The drives and their associated computer-readable media provide nonvolatile storage of computer readable instructions, data structures, program modules, and other data for computer 502. Although the exemplary environment described herein employs a hard disk 516, a removable magnetic disk 518 and a removable optical disk 522, it should be appreciated by those skilled in the art that other types of computer readable media which can store data that is accessible by a computer, such as magnetic cassettes, flash memory cards, digital video disks, RAMs, ROM, and the like, may also be used in the exemplary operating environment.

A number of program modules may be stored on the hard disk 516, magnetic disk 520, optical disk 522, ROM 512, or RAM 510, including, by way of example, and not limitation, an operating system 528, one or more application programs 530, other program modules 532, and program data 534. Each of the operating system 528, one or more application programs 530 other program modules 532, and program data 534 or some combination thereof, may include an implementation carrying out the operations depicted FIGS. 1 and 3-4.

A user may enter commands and information into computer 502 through optional input devices such as a keyboard 536 and a pointing device 538 (such as a "mouse"). Other input devices (not shown) may include a microphone, joystick, game pad, satellite dish, serial port, scanner, camera, or the like. These and other input devices are connected to the processor unit 504 through a user input interface 540 that is coupled to bus 508, but may be connected by other interface and bus structures, such as a parallel port, game port, or a universal serial bus (USB).

An optional monitor 542 or other type of display device is also connected to bus 508 via an interface, such as a video adapter 544. In addition to the monitor, personal computers typically include other peripheral output devices (not shown), such as speakers and printers, which may be connected through output peripheral interface 546.

Computer 502 may operate in a networked environment using logical connections to one or more remote computers, such as a remote server/computer 548. Remote computer 548 may include many or all of the elements and features described herein relative to computer 502.

Logical connections shown in FIG. 5 are a local area network (LAN) 550 and a general wide area network (WAN) 552. Such networking environments are commonplace in offices, enterprise-wide computer networks, intranets, and the Internet. When used in a LAN networking environment, the computer 502 is connected to LAN 550 via network interface or adapter 554. When used in a WAN networking environment, the computer typically includes a modem 556 or other means for establishing communications over the WAN 552. The modem, which may be internal or external, may be connected to the system bus 508 via the user input interface 540 or other appropriate mechanism.

In a networked environment, program modules depicted relative to the personal computer 502, or portions thereof, may be stored in a remote memory storage device. By way of example, and not limitation, FIG. 5 illustrates remote application programs 558 as residing on a memory device of remote computer 548. It will be appreciated that the network connections shown and described are exemplary and other means of establishing a communications link between the computers may be used.

An implementation of an exemplary computer 502 may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

While the invention has been particularly shown and described in conjunction with a preferred embodiment thereof, it will be appreciated that variations and modifications will occur to those skilled in the art. Therefore, it is to be understood that the appended claims are intended to cover all such modifications and changes as fall within the true spirit of the invention.

What is claimed is:

1. A method, comprising:
   receiving at least one design library element having a design marker shape associated therewith;
   applying a yield checking tool having a plurality of library element types each having a yield checking deck threshold and a marker shape to the at least one design library element;
   comparing the design marker shape of the at least one design library element to each of the marker shapes associated with the plurality of library element types;
   ascertaining which of the marker shapes associated with the plurality of library element types matches with the design marker shape associated with the at least one design library element; and
   determining whether the at least one design library element satisfies the yield checking deck threshold associated with the library element type having a marker shape that matches with the design marker shape of the at least one design library element.

2. The method according to claim 1, further comprising updating the at least one design library element in response to determining that the at least one design library element is unable to satisfy the yield checking deck threshold associated with the library element type having a marker shape that matches with the design marker shape of the at least one design library element.

3. The method according to claim 2, further comprising determining whether the updated at least one design library element satisfies the yield checking deck threshold associated with the library element type having a marker shape that matches with the design marker shape of the at least one design library element.

4. The method according to claim 1, further comprising completing the at least one design library element in response to determining that the at least one design library element satisfies the yield checking deck threshold associated with the library element type having a marker shape that matches with the design marker shape of the at least one design library element.

5. The method according to claim 1, wherein the at least one design library element is integrated in a product design formed from a plurality of design library elements each having a design marker shape associated therewith, the product design further including design library element to design library element placement for the design library elements and product level wiring for the design library elements, the design library element to design library element placement and product level wiring each having a design marker shape.

6. The method according to claim 5, further comprising:
applying the yield checking tool to the product design, the yield checking further including library element to library element placement of library elements and product level wiring of the library elements, the library element to library element placement and product level wiring each having a yield checking deck threshold and a marker shape associated therewith;
comparing each of the design marker shapes of the product design including the design marker shapes associated with the plurality of design library elements, design library element to design library element placement and product level wiring to each of the marker shapes associated with the plurality of library element types, library element to library element placement and product level wiring in the yield checking tool;
for each design marker shape associated with the plurality of design library elements in the product design, design library element to design library element placement and product level wiring, ascertaining a marker shape from the yield checking tool that is a match; and
determining whether each of the plurality of design library elements, design library element to design library element placement and product level wiring satisfy the yield checking deck thresholds associated with marker shapes in the yield checking tool that are identified as a match.

7. The method according to claim 6, further comprising updating any of the plurality of design library elements, placement of the design library elements and product level wiring that fail to satisfy the yield checking deck thresholds associated with the matching marker shapes.

8. The method according to claim 7, further comprising determining whether any of the updated plurality of design library elements, placement of the design library elements and product level wiring satisfy the yield checking deck thresholds associated with the matching marker shapes.

9. The method according to claim 8, further comprising completing the product design for release in response to determining that all of the plurality of design library elements, placement of the design library elements and product level wiring satisfy yield checking deck thresholds.

10. A method, implemented on a computer system, for optimizing yield of a product design, comprising:
obtaining a product design formed from a plurality of design library elements each having a design marker shape associated therewith, the product design further including design library element to design library element placement for the design library elements and product level wiring for the design library elements, the design library element to design library element placement and product level wiring each having a design marker shape associated therewith;
applying a yield checking tool having a plurality of library element types, library element to library element placement of the library elements, and product level wiring information of the library elements, the plurality of library element types, library element to library element placement, and product level wiring each having a yield checking deck threshold and a marker shape;
comparing each of the design marker shapes of the product design including the design marker shapes associated with the plurality of design library elements, design library element to design library element placement and product level wiring to each of the marker shapes associated with the plurality of library element types, library element to library element placement and product level wiring information in the yield checking tool;
for each design marker shape associated with the plurality of design library elements in the product design, design library element to design library element placement and product level wiring, ascertaining a marker shape from the yield checking tool that is a match; and
determining whether each of the plurality of design library elements design library element to design library element placement and product level wiring satisfy the yield checking deck thresholds associated with marker shapes in the yield checking tool that are identified as a match.

11. The method according to claim 10, further comprising updating any of the plurality of design library elements, placement of the design library elements and product level wiring that fail to satisfy the yield checking deck thresholds associated with the matching marker shapes.

12. The method according to claim 11, further comprising determining whether any of the updated plurality of design library elements, placement of the design library elements and product level wiring satisfy the yield checking deck thresholds associated with the matching marker shapes.

13. The method according to claim 12, further comprising completing the product design for release in response to determining that all of the plurality of design library elements, placement of the design library elements and product level wiring satisfy yield checking deck thresholds.

14. A non-transitory computer-readable medium storing computer instructions, which when executed by a computer system, enables the computer system to optimize yield, the computer instructions comprising:
receiving at least one design library element having a design marker shape associated therewith;
applying a yield checking tool having a plurality of library element types each having a yield checking deck threshold that is specified to optimize yield and a marker shape to the at least one design library element;
comparing the design marker shape of the at least one design library element to each of the marker shapes associated with the plurality of library element types;
ascertaining which of the marker shapes associated with the plurality of library element types matches with the design marker shape associated with the at least one design library element; and
determining whether the at least one design library element satisfies the yield checking deck threshold associated with the library element type having a marker shape that matches with the design marker shape of the at least one design library element.

15. The non-transitory computer-readable medium according to claim 14, further comprising computer instructions for updating the at least one design library element in response to determining that the at least one design library element is unable to satisfy the yield checking deck threshold associated with the library element type having a marker shape that matches with the design marker shape of the at least one design library element.

16. The non-transitory computer-readable medium according to claim 15, further comprising computer instructions for determining whether the updated at least one design library element satisfies the yield checking deck threshold associated with the library element type having a marker shape that matches with the design marker shape of the at least one design library element.

17. The non-transitory computer-readable medium according to claim 14, further comprising computer instructions for completing the at least one design library element for release in response to determining that the at least one design library element satisfies the yield checking deck threshold associated with the library element type having a marker shape that matches with the design marker shape of the at least one design library element.

18. The non-transitory computer-readable medium according to claim 14, wherein the at least one design library element is integrated in a product design formed from a plurality of design library elements each having a design marker shape associated therewith, the product design further including design library element to design library element placement for the design library elements and product level wiring for the design library elements, the design library element to design library element placement and product level wiring each having a design marker shape.

19. The non-transitory computer-readable medium according to claim 18, further comprising computer instructions for:
applying the yield checking tool to the product design, the yield checking further including library element to library element placement for the library elements and product level for the library elements, the library element to library element placement and product level wiring each having a yield checking deck threshold and a marker shape associated therewith;
comparing each of the design marker shapes of the product design including the design marker shapes associated with the plurality of design library elements, design library element to design library element placement and product level wiring to each of the marker shapes associated with the plurality of library element types, library element to library element placement and product level wiring in the yield checking tool;
for each design marker shape associated with the plurality of design library elements in the product design, design library element to design library element placement and product level wiring, ascertaining a marker shape from the plurality of library element types that is a match; and
determining whether each of the plurality of design library elements, design library element to design library element placement and product level wiring satisfy the yield checking deck thresholds associated with marker shapes in the yield checking tool that are identified as a match.

20. The non-transitory computer-readable medium according to claim 19, further comprising computer instructions for:
updating any of the plurality of design library elements, placement of the design library elements and product level wiring that fail to satisfy the yield checking deck thresholds associated with the matching marker shapes;
determining whether any of the updated plurality of design library element, placement of the design library elements and product level wiring satisfy the yield checking deck thresholds associated with the matching marker shapes; and
completing the product design for release in response to determining that all of the plurality of design library elements, placement of the design library elements and product level wiring satisfy yield checking deck thresholds.

* * * * *